(12) United States Patent
Maeda et al.

(10) Patent No.: US 11,621,622 B2
(45) Date of Patent: Apr. 4, 2023

(54) VIBRATION GENERATOR

(71) Applicant: ALPS ALPINE CO., LTD., Tokyo (JP)

(72) Inventors: Masanobu Maeda, Miyagi (JP); Katsutoshi Suzuki, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 480 days.

(21) Appl. No.: 17/000,705

(22) Filed: Aug. 24, 2020

(65) Prior Publication Data

US 2021/0067021 A1    Mar. 4, 2021

(30) Foreign Application Priority Data

Aug. 28, 2019  (JP) .............................. JP2019-156104

(51) Int. Cl.
*H02K 33/02*    (2006.01)
*H02K 33/18*    (2006.01)
*B06B 1/04*    (2006.01)

(52) U.S. Cl.
CPC ............. *H02K 33/02* (2013.01); *H02K 33/18* (2013.01); *B06B 1/045* (2013.01)

(58) Field of Classification Search
CPC ........ H02K 33/18; H02K 33/16; H02K 33/02; H02K 35/04; H02K 35/00; B06B 1/045
See application file for complete search history.

(56) References Cited

U.S. PATENT DOCUMENTS

| 2007/0085425 | A1* | 4/2007 | Hirashima | H02K 33/16 |
| | | | | 310/15 |
| 2017/0033654 | A1 | 2/2017 | Wang et al. | |
| 2017/0033669 | A1* | 2/2017 | Xu | H02K 33/16 |
| 2019/0190365 | A1* | 6/2019 | Takeda | B06B 1/04 |
| 2020/0161954 | A1* | 5/2020 | Tsuchihashi | H02K 33/16 |

FOREIGN PATENT DOCUMENTS

| JP | 2017-034963 | 2/2017 | |
| WO | WO-2019003877 A1 * | 1/2019 | H02K 33/16 |

* cited by examiner

*Primary Examiner* — Tulsidas C Patel
*Assistant Examiner* — Robert E Mates
(74) *Attorney, Agent, or Firm* — IPUSA, PLLC (57) ABSTRACT

A vibration generator includes a housing, a first vibrator, and a second vibrator. The first vibrator includes a hollow yoke having a through hole, a magnet disposed within the through hole of the yoke, and a first elastic support member. The second vibrator includes a coil disposed above or below the magnet within the through hole of the yoke, and a second elastic support member to which the coil is fixed and that is disposed to extend from the inside to the outside of the through hole of the yoke and that is fixed to the housing. The first vibrator vibrates at a first natural frequency in a direction connecting both side portions of the yoke. The second vibrator vibrates at a second natural frequency that is different from the first natural frequency, in the direction connecting the both side portions of the yoke.

6 Claims, 9 Drawing Sheets

VIBRATION GENERATOR

CROSS-REFERENCE TO RELATED APPLICATIONS

This application is based on and claims priority to Japanese Patent Application No. 2019-156104, filed on Aug. 28, 2019, the entire contents of which are incorporated herein by reference.

BACKGROUND OF THE INVENTION

1. Field of the Invention

The disclosures herein relate to a vibration generator.

2. Description of the Related Art

Conventionally, an electric vibration motor that includes a casing having a housing space, a first vibration system, and a second vibration system is known. The first vibration system is elastically supported within the casing, and includes a first counterweight, a second counterweight disposed facing and spaced apart from the first counterweight, and a coupling part that couples the first counterweight to the second counterweight. The second vibration system is elastically supported within the casing, and includes a third counterweight. A part of the third counterweight is interposed between the first counterweight and the second counterweight, one of the first vibration system and the second vibration system includes a coil, and the other of the first vibration system and the second vibration includes a magnetic assembly disposed facing the coil. The magnetic assembly includes a magnetic generator, and may be a magnet (see Patent Document 1, for example).

The conventional electric vibration motor does not include a yoke. Therefore, a large amount of a magnetic field generated by the magnetic assembly may leak, thus making it difficult to efficiently utilize the magnetic field to generate vibrations. Further, if a yoke is included, the yoke may interfere with an elastic support member.

RELATED-ART DOCUMENTS

Patent Documents

[Patent Document 1] Japanese Laid-Open Patent Publication No. 2017-034963

SUMMARY OF THE INVENTION

It is a general object of the described embodiments to provide a vibration generator that efficiently utilizes magnetic fields to generate vibrations while securely preventing interference between a yoke and an elastic support member.

According to an aspect of an embodiment, a vibration generator includes a housing, a first vibrator, and a second vibrator. The first vibrator includes a hollow yoke having a through hole, a magnet disposed within the through hole of the yoke, and a first elastic support member. The second vibrator includes a coil disposed above or below of the magnet within the through hole of the yoke, and a second elastic support member to which the coil is fixed and that is disposed to extend from the inside to the outside of the through hole of the yoke and that is fixed to the housing. The first vibrator is supported within the housing via the first elastic support member and configured to vibrate at a first natural frequency in a direction connecting both side portions of the yoke. The second vibrator is supported within the housing and configured to vibrate at a second natural frequency in the direction connecting the both side portions of the yoke. The second natural frequency is different from the first natural frequency.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

According to an aspect of an embodiment, it is possible to provide a vibration generator that efficiently utilizes magnetic fields to generate vibrations while securely preventing interference between a yoke and an elastic support member.

In the following, a vibration generator according to embodiments of the present invention will be described with reference to the accompanying drawings.

Embodiments

Figure 1:
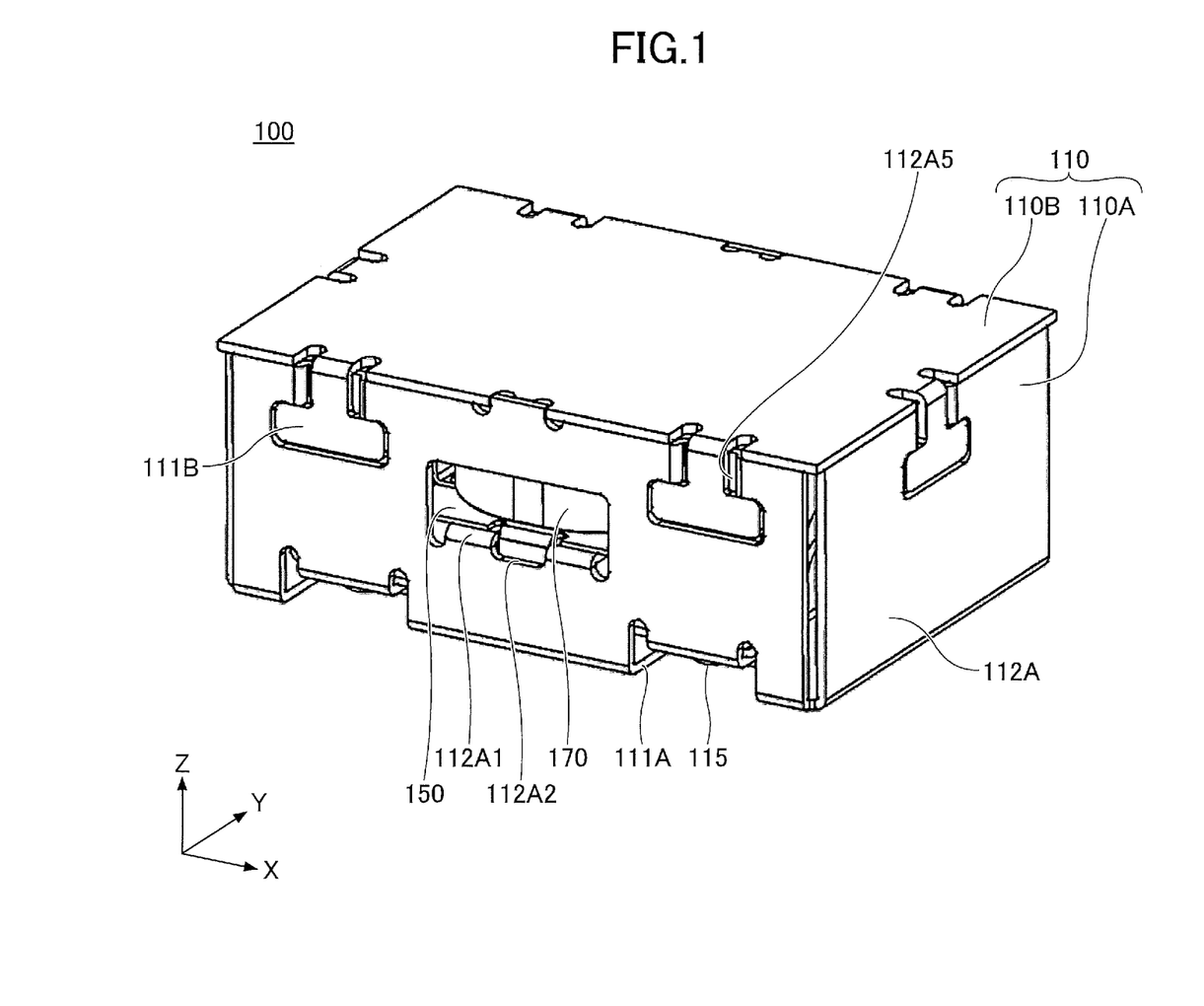
FIG. 1 is a perspective view of a vibration generator 100 according to an embodiment.
Figure 2:
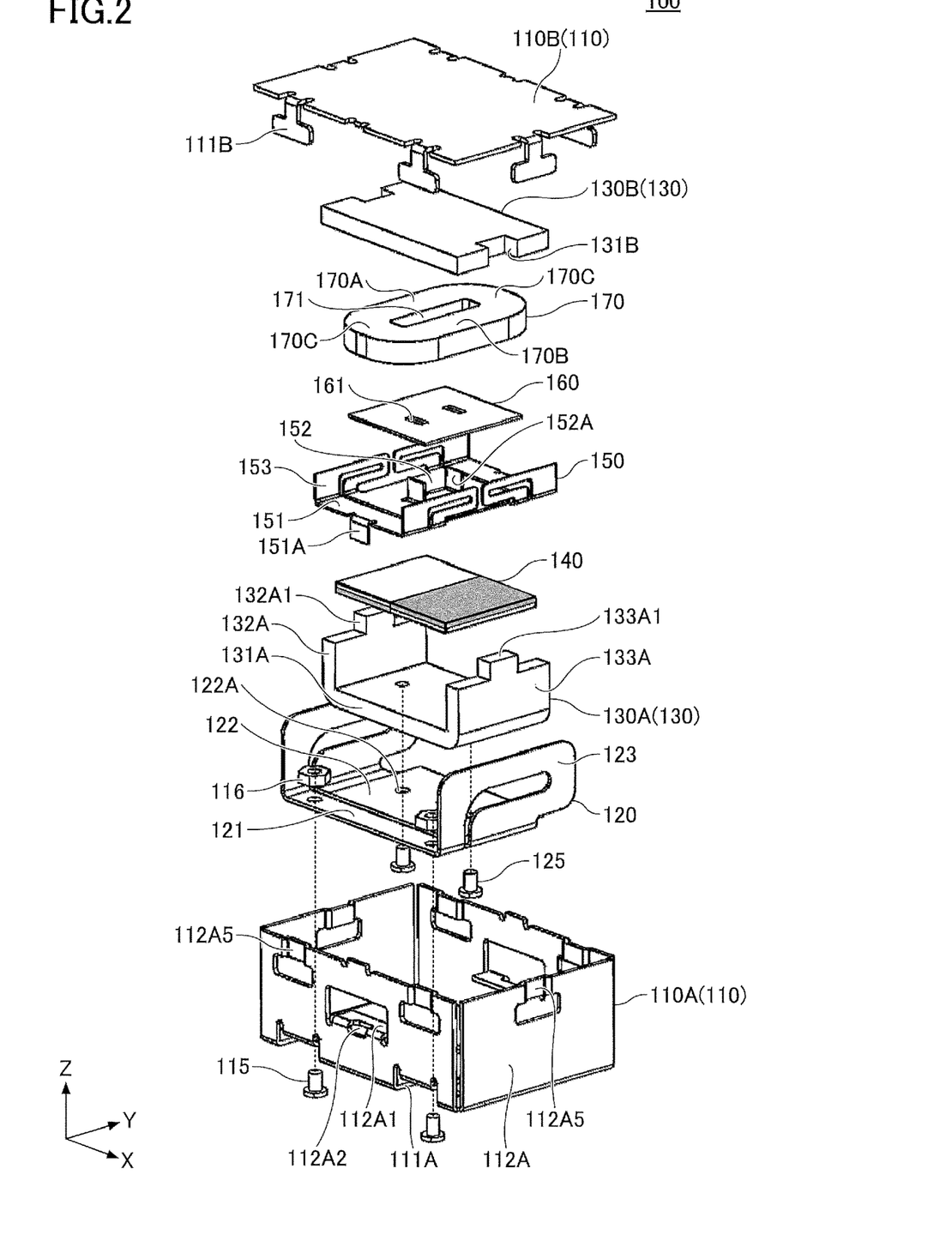
FIG. 2 is an exploded perspective view of the vibration generator 100.

FIG. 1 is a perspective view of a vibration generator 100 according to an embodiment. FIG. 2 is an exploded perspective view of the vibration generator 100.

In the following, an XYZ Cartesian coordinate system is used for description. For convenience of description, a surface and an end on the +Z side may be referred to as an upper surface and an upper end, and a surface and an end on the −Z side may be referred to as a lower surface and a lower end. However, this positional relationship does not represent a universal relationship. Further, a plan view refers to a view in the XY plane.

The vibration generator 100 includes a housing 110, a spring 120, a yoke 130, a magnet 140, a spring 150, a spacer 160, and a coil 170. Referring to FIG. 3 through FIG. 6 in addition to FIG. 1 and FIG. 2, the configuration of the vibration generator 100 will be described.

Figure 3:
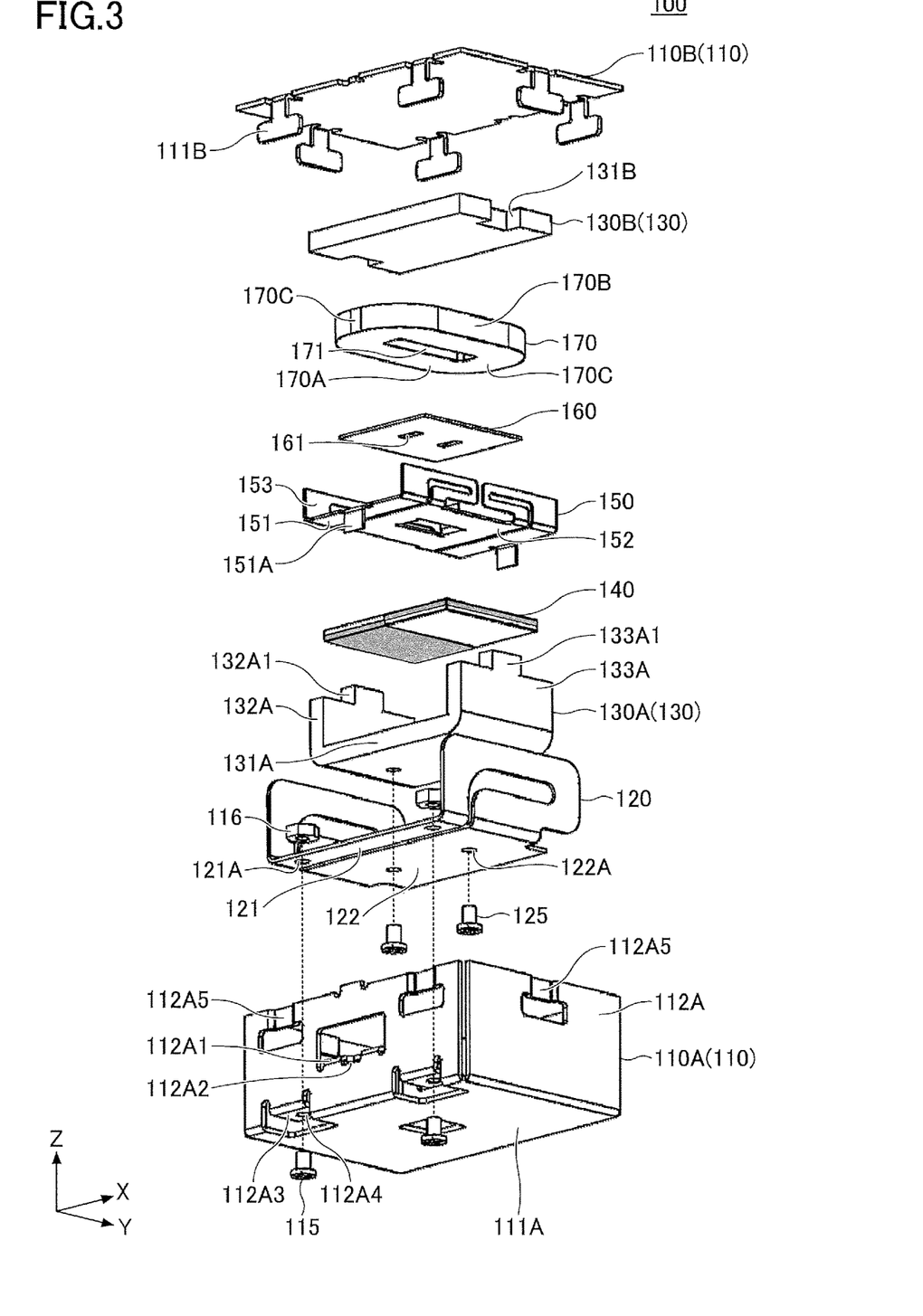
FIG. 3 is an exploded perspective view of the vibration generator 100 when viewed from below.
Figure 4:
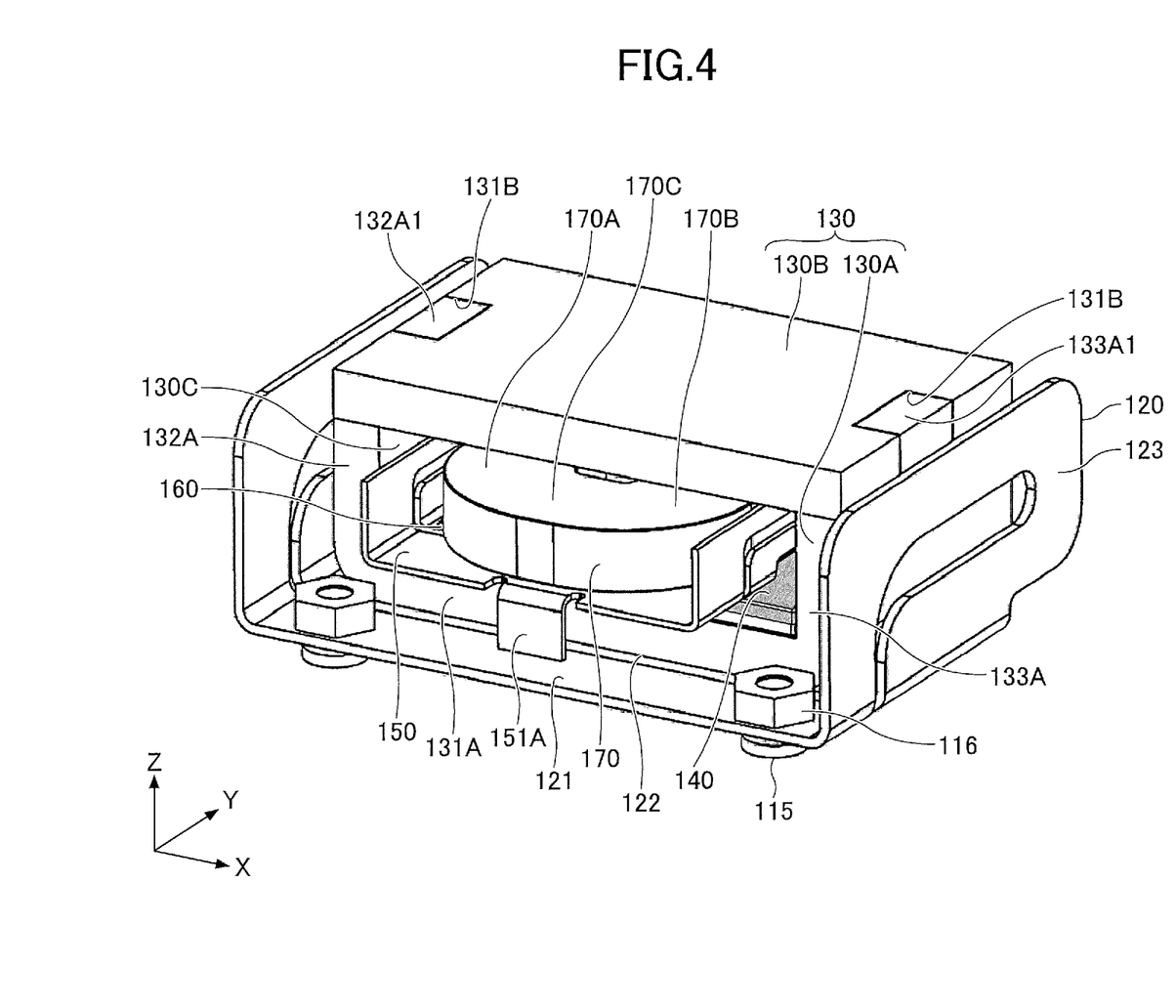
FIG. 4 is a diagram illustrating the vibration generator 100 in which a housing 110 is not depicted.
Figure 5:
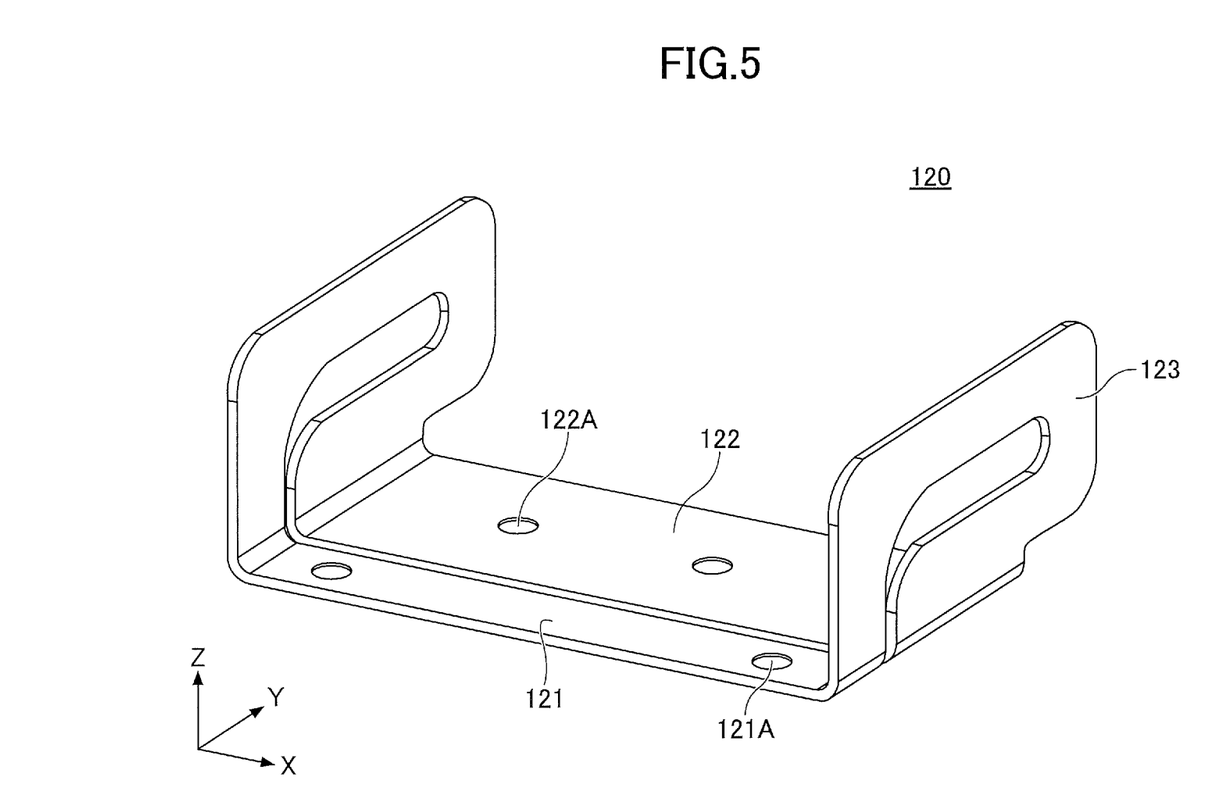
FIG. 5 is a perspective view of a spring 120.
Figure 6:
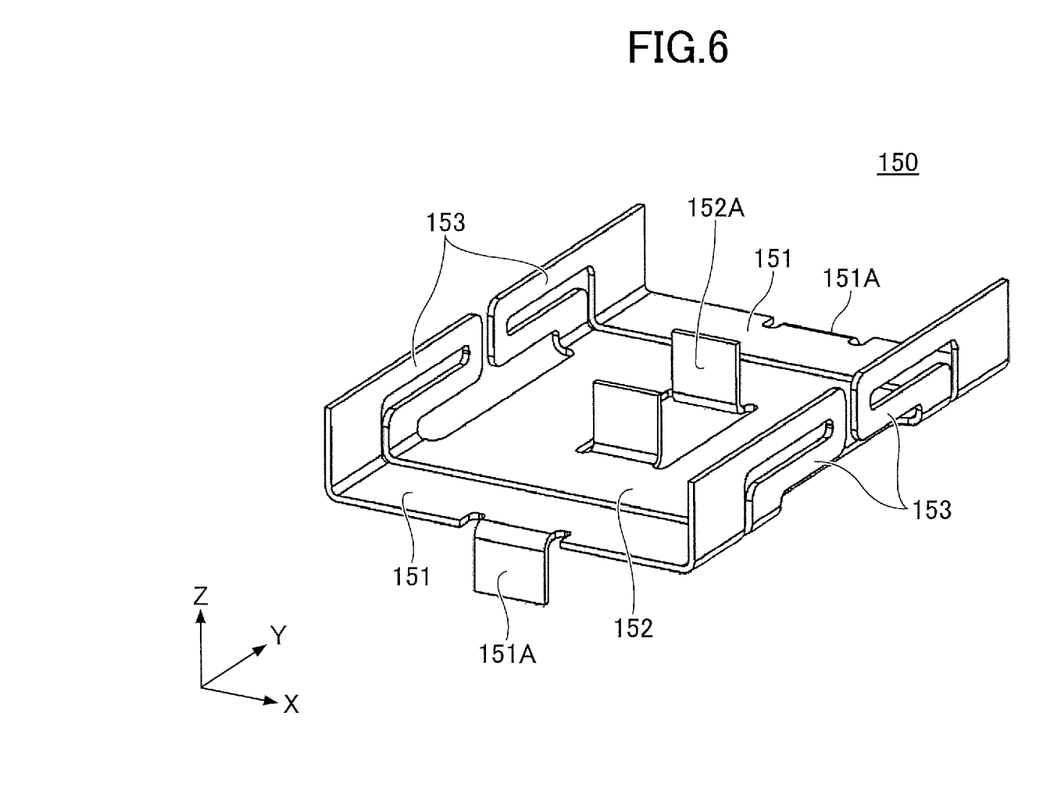
FIG. 6 is a perspective view of a spring 150.

FIG. 3 is an exploded perspective view of the vibration generator 100 when viewed from below. FIG. 4 is a diagram illustrating the vibration generator 100 in which the housing 110 is not depicted. FIG. 5 is a perspective view of the spring 120. FIG. 6 is a perspective view of the spring 150.

In the vibration generator 100, the spring 120, the yoke 130, and the magnet 140 are examples of a first vibrator, and the spring 150, the spacer 160, and the coil 170 are examples of a second vibrator. The mechanism by which the first vibrator and the second vibrator vibrate will be described later. First, the configuration of each of the components will be described.

The housing 110 is a rectangular enclosure. The housing 110 includes a base 110A and a cover 110B.

The base 110A is a part of the rectangular hollow housing 110, in which the top cover 110B is excluded. The base 110A has a bottom wall 111A (see FIG. 1 through FIG. 3) that is parallel to the XY plane, and four side walls 112A (see FIG. 1 through FIG. 3) that surround the four sides.

Bent portions 112A1 that are bent inward at right angles are formed at the center of two side walls 112A that are parallel to the XZ plane. Openings 112A2 are formed at the center in the width direction (X direction) and on the −Y side of the bent portions 112A1.

Further, two bent portions 112A3 are formed on the +X side and the −X side of lower portions of a side wall 112A that is parallel to the XZ plane and located on the −Y side. The bent portions 112A3 are formed by cutting the lower portions of the side wall 112A, which is parallel to the XZ plane and located on the −Y side, into U shapes and bending the cut portions parallel to the XY plane. The bent portions 112A3 are offset in the +Z direction relative to the bottom wall 111A, and are provided with screw holes 112A4 (see FIG. 3) into which screws 115 are inserted.

Further, two engagement portions 112A5 that engage with the cover 110B are formed at the upper side of the two side walls 112A that are parallel to the XZ plane. In addition, one engagement portion 112A5 that engages with the cover 110B is formed at the upper side of each of two side walls 112A that are parallel to the YZ plane.

Six protrusions 111B, of which four are bent parallel to the XZ plane and two are bent parallel to the YZ plane, are formed on the four sides of a plate-shaped member, parallel to the XY plane, of the cover 110B. The protrusions 111B are inverted T-shaped leaf springs, and engage with the engagement portions 112A5 of the side walls 112A. Portions of the engagement portions 112A5 corresponding to base portions of the inverted T-shaped leaf springs are offset inward. In addition, the engagement portions 112A5 have openings at positions corresponding to tip portions of the inverted T-shaped leaf springs.

By engaging the protrusions 111B of the cover 110B with the engagement portions 112A5 of the base 110A, the cover 110B can be fixed to the base 110A. For example, the base 110A and the cover 110B may be produced by punching pieces of sheet metal into shapes corresponding to the base 110A and the cover 110B, and bending each portion.

The spring 120 (first elastic support member) includes a fixing portion 121, a movable portion 122, and intermediate portions 123. The spring 120 is a metal spring, and can be made by punching and bending sheet metal.

The fixing portion 121 is located on the −Y side and extends in the X direction, and has two screw holes 121A spaced apart from each other in the X direction. The fixing portion 121 has an elongated plate shape that is parallel to the XY plane. The fixing portion 121 is fixed to the bent portions 112A3 of the base 110A of the housing 110 by inserting the screws 115 into the screw holes 121A and the screw holes 112A4 and tightening the screws 115 with nuts 116, with the screw holes 121A of the fixing portion 121 being aligned with the screw holes 112A4 of the bent portions 112A3 of the base 110A. As the bent portions 112A3 are offset in the +Z direction, the fixing portion 121 fixed to the bent portions 112A3 is located above the bottom wall 111A.

The movable portion 122 is connected to the fixing portion 121 via the intermediate portions 123. The movable portion 122 is spaced apart from the fixing portion 121, and is located on the +Y side relative to the fixing portion 121. The movable portion 122 has a rectangular plate shape in plan view parallel to the XY plane. The position (height) in the Z direction of the movable portion 122 is equal to that of the fixing portion 121. The movable portion 122 is movable in the ±X direction with respect to the fixing portion 121.

Two screw holes 122A are formed at the center of the movable portion 122, while being spaced apart from each other in the X direction. A yoke portion 130A of the yoke 130 is fixed to the movable portion 122 by inserting screws 125 through the screw holes 122A.

The intermediate portions 123 are provided between the fixing portion 121 and the movable portion 122, and connect the fixing portion 121 to the movable portion 122. The intermediate portions 123 are provided on both sides in the X-direction of the spring 120. The intermediate portions 123 are bent at right angles to the fixing portion 121 and the movable portion 122, and are parallel to the YZ plane.

The intermediate portions 123 extend in the +Z direction from portions (bent portions) connected to the fixing portion 121, extend in the +Y direction, extend in the −Z direction, extend back in the −Y direction, and are then connected to respective sides in the X direction of the movable portion 122.

The intermediate portions 123 have elasticity, and can be flexed such that portions connected to the movable portion 122 can be moved in the ±X direction with respect to the portions connected to the fixing portion 121. Accordingly, the movable portion 122 is movable in the ±X direction with respect to the fixing portion 121.

The yoke 130 includes the yoke portion 130A and a top yoke portion 130B. For example, the yoke 130 may be made of pure iron with low impurities or made of low-carbon steel. The yoke 130 is disposed to form a magnetic circuit through which a magnetic flux generated by the magnet 140 passes.

The yoke portion 130A is a part of the yoke 130, in which the top yoke portion 130B parallel to the XY plane is excluded. The yoke portion 130A has an approximately C-shape when viewed in the XZ plane. The yoke portion 130A includes a bottom portion 131A parallel to the XY plane, and side portions 132A and 133A projecting in the +Z direction and located on both sides in the X direction of the bottom portion 131A. The side portion 132A is an example of a first side portion and the side portion 133A is an example of a second side portion. Protrusions 132A1 and 133A1 that protrude upward are formed on the upper ends of the side portions 132A and 133A, respectively.

The top yoke portion 130B is an example of a top plate portion and has a flat plate shape parallel to the XY plane. The length in the X direction of the top yoke portion 130B is equal to the length in the X direction of the yoke portion 130A, and the width in the Y direction of the top yoke portion 130B is equal to the width in the Y direction of the yoke portion 130A. In addition, the thickness of the top yoke portion 130B is equal to the thickness of the yoke portion 130A.

The top yoke portion 130B has engagement portions 131B on both ends in the X direction. The engagement portions 131B are formed by cutting central portions, on the both ends in the X direction of the top yoke portion 130B, into rectangular shapes inwardly in the X direction. The positions of the engagement portions 131B correspond to the positions of the protrusions 132A1 and 133A1, and the engagement portions 131B are formed such that the protrusions 132A1 and 133A1 can fit the engagement portions 131B without gaps.

The yoke 130 is assembled by engaging the protrusions 132A1 and 133A1 of the yoke portion 130A with the engagement portions 131B of the top yoke portion 130B, with the position of the top yoke portion 130B being aligned with the position of the yoke portion 130A. Note that the yoke portion 130A and the top yoke portion 130B may be bonded together with an adhesive or the like.

The yoke 130 is a hollow yoke in which the bottom portion 131A, the side portion 132A, the top yoke portion 130B, the side portion 133A are connected in this order, and a through hole 130C (see FIG. 4) is formed in the Y direction.

The magnet 140, the spring 150, the spacer 160, and the coil 170 are disposed within the through hole 130C of the yoke 130. Both ends in the Y direction of the magnet 140, the spring 150, the spacer 160, and the coil 170 project outward in the Y direction relative to the yoke 130 in plan view, and the magnet 140, the spring 150, the spacer 160, and the coil 170 are disposed within the through hole 130C so as to extend through the yoke 130.

The magnet 140 is disposed within the through hole 130C of the yoke 130. More specifically, the magnet 140 is disposed on the upper surface of the bottom portion 131A of the yoke portion 130A and is bonded to the upper surface with an adhesive or the like. The magnet 140 has four poles, two N-poles and two S-poles. The N-poles are indicated in gray, and the S-poles are indicated in white. The four poles are located in four respective regions formed by dividing the thin plate-shaped magnet 140 into a +X side and a −X side from the center in the X direction, and also divided into a +Z side and a −Z side in the thickness direction (Z direction) of the magnet 140.

One of the N-poles is located in a region on both the +X side and the +Z side, and the other N-pole is located in a region on both the −X side and the −Z side. One of the S-poles is located in a region on both the +X side and the −Z side, and the other S-pole is located in a region on both the −X side and the +Z side.

The magnet 140 is configured such that magnetic fields generated on the +X side and the −X side are in opposite directions. Because the magnet 140 is disposed within the through hole 130C of the yoke 130, a magnetic field in the +Z direction is generated on the exterior of the −X side of the magnet 140, and a magnetic field in the −Z direction is generated on the exterior of the +X side of the magnet 140.

Therefore, a magnetic flux in the +Z direction is generated at the side portion 132A of the yoke 130, and a magnetic flux in the −Z direction is generated at the side portion 133A of the yoke 130.

The spring 150 (second elastic support member) includes two fixing portions 151, one movable portion 152, and four intermediate portions 153 (see particularly FIG. 6). The spring 150 is a metal spring, and can be made by punching and bending sheet metal. The spring 150 has a shape in which two springs 120 are connected.

The fixing portions 151 are located on the +Y side and the −Y side and extend in the X direction, and have protrusions 151A at the center in the X direction. The protrusions 151A are bent and protrude in the −Z direction from both ends in the Y direction of the spring 150.

The fixing portions 151 have elongated plate shapes that are parallel to the XY plane. The fixing portions 151 are placed on the bent portion 112A1 by inserting the protrusions 151A into the openings 112A2 of the housing 110. In this manner, the fixing portions 151 of the spring 150 are fixed to the housing 110. In this state, the spring 150 is located within the through hole 130C of the yoke 130, and the fixing portions 151 and the movable portion 152 are located above the magnet 140. There is a gap between the upper surface of the magnet 140 and the lower surfaces of the fixing portions 151 and the movable portion 152, and the upper surface of the magnet 140 does not contact the lower surfaces of the fixing portions 151 and the movable portion 152.

The movable portion 152 is connected to the two fixing portions 151 via the four intermediate portions 153. The movable portion 152 is disposed between the two fixing portions 151 while being spaced apart from the two fixing portions 151. The movable portion 152 has a rectangular plate shape in plan view parallel to the XY plane. The position (height) in the Z direction of the movable portion 152 is equal to that of the two fixing portions 151. The movable portion 152 is movable in the ±X direction with respect to the fixing portions 151.

Two bent portions 152A are formed at the center of the movable portion 152 while being spaced apart from each other in the Y direction. The bent portions 152A are bent in the +Z direction, and are disposed to fix the spacer 160 to the movable portion 152.

The four intermediate portions 153 are provided between the two fixing portions 151 and the one movable portion 152, and connect the fixing portions 151 to the movable portion 152.

The intermediate portions 153 are bent at right angles to the fixing portions 151 and the movable portion 152, and are parallel to the YZ plane. The configuration of the intermediate portions 153 is similar to that of the intermediate portions 123 of the spring 120.

The intermediate portions 153 have elasticity, and can be flexed such that portions connected to the movable portion 152 can be moved in the ±X direction with respect to portions connected to the fixing portion 151. Accordingly, the movable portion 152 is movable in the ±X direction with respect to the fixing portions 151.

The spacer 160 is a thin plate-shaped member parallel to the XY plane. Two openings 161 (see FIG. 2 and FIG. 3) are formed at the center of the spacer 160, while being spaced apart from each other in the Y direction. The spacer 160 is disposed on the upper surface of the movable portion 152 of the spring 150, with the bent portions 152A being inserted into the openings 161. The coil 170 is disposed on the upper surface of the spacer 160.

The spacer 160 is disposed such that the coil 170 and the fixing portions 151 are spaced apart from each other in the Z direction, and the coil 170 does not contact the fixing portions 151.

The spacer 160 is preferably made of a material with low permeability, such as a resin, in order to minimize effects on magnetic properties of the magnet 140 and the coil 170.

The coil 170 is a coil around which a wire (such as a copper wire) is wound, and has an elliptical shape in plan view parallel to the XY plane. In the figures, the wire of the coil 170 is not depicted. The configuration of the coil 170 will be described below.

The coil 170 includes a straight portion 170A that is located on the −X side and extends linearly in the Y direction, a straight portion 170B that is located on the +X side and extends linearly in the Y direction, and circular-arc shaped portions 170C that connect the straight portions 170A and 170B at both sides in the Y direction. The coil 170 is wound in an annular shape in plan view (see FIG. 2 and FIG. 3). The coil 170 may be a bobbinless coil, and has an opening 171 at the center.

The coil 170 is fixed to the upper surface of the spacer 160. An adhesive may be used to fix the coil 170. The coil 170 is movable in the ±X direction together with the movable portion 152 of the spring 150.

The above-described vibration generator 100 is assembled as follows. The yoke portion 130A of the yoke 130, on which the magnet 140 is disposed, is fixed to the spring 120, and the fixing portion 121 is fixed to the bent portions 112A3 of the base 110A of the housing 110 with the screws 115 and the nuts 116. In this state, the protrusions 151A of the spring 150, on which the spacer 160 and the coil 170 are disposed, are inserted into the openings 112A2 of the base 110A of the housing 110, and the top yoke portion 130B is fixed to the yoke portion 130A. Then, the cover 110B is attached to the base 110A of the housing 110 (see FIG. 1).

The vibration generator 100 is assembled as described above. Because the yoke 130 is separated into the top yoke portion 130B (top plate portion) and the yoke portion 130A, the magnet 140, the spring 150, the spacer 160, and the coil 170 can be readily disposed within the through hole 130C of the yoke 130.

Figure 7:
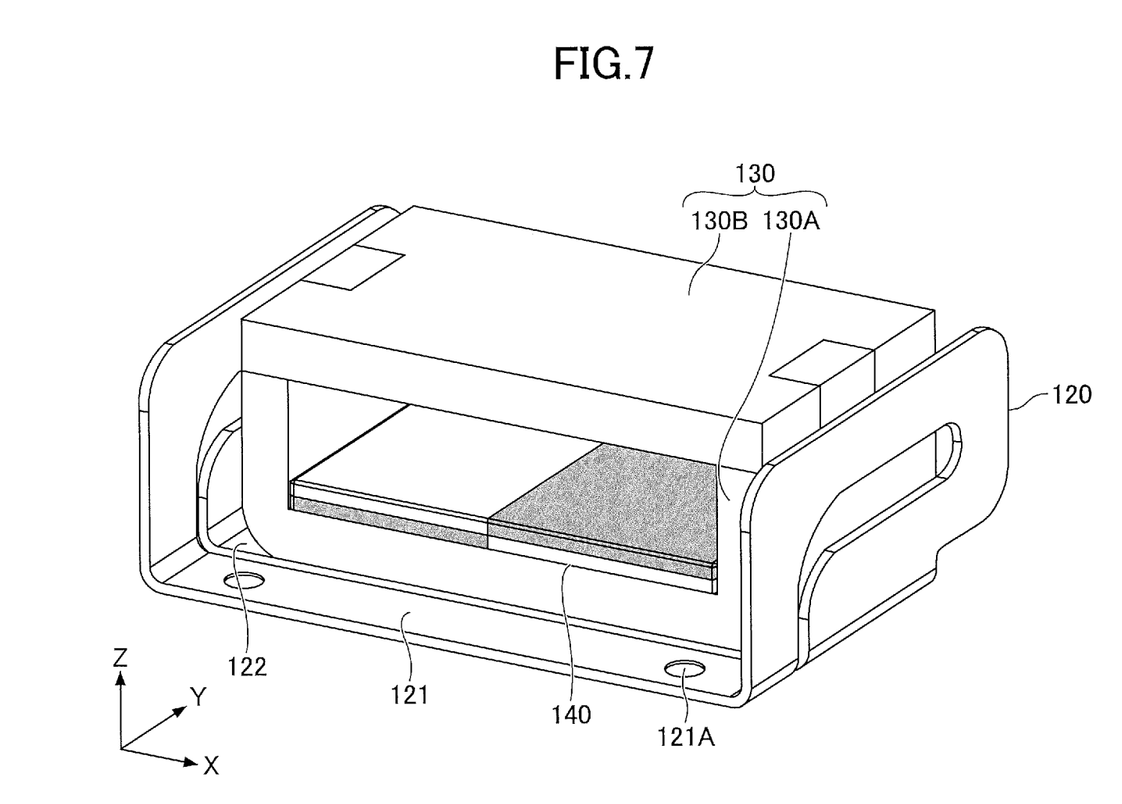
FIG. 7 is a perspective view of a first vibrator.

In the vibration generator 100 having the above-described configuration, in the first vibrator that includes the spring 120, the yoke 130, and the magnet 140, the movable portion 122, on which the yoke 130 and the magnet 140 are disposed, vibrates in the ±X direction with respect to the fixing portion 121. The natural frequency of this vibration is an example of a first natural frequency, and the resonant frequency is represented as f1. The first vibrator is as illustrated in FIG. 7.

The resonant frequency f1 is determined mainly by the spring constant of the spring 120 and the weight of the spring 120, the yoke 130, and the magnet 140. Therefore, the spring constant of the spring 120 may be set to an appropriate value by taking into consideration the resonant frequency f1 and the weight of the spring 120, the yoke 130, and the magnet 140.

Figure 8:
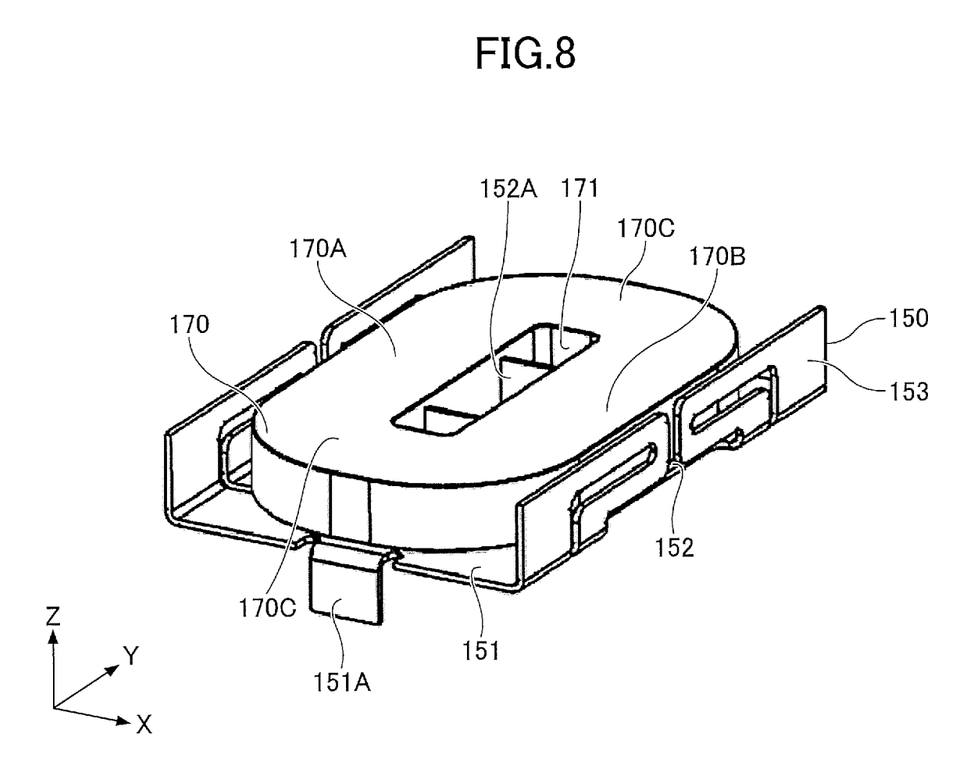
FIG. 8 is a perspective view of a second vibrator.

Further, in the second vibrator that includes the spring 150, the spacer 160, and the coil 170, the movable portion 152, on which the spacer 160 and the coil 170 are disposed, vibrates in the ±X direction with respect to the fixing portions 151. The natural frequency of this vibration is an example of a second natural frequency, and the resonant frequency is represented as f2. The second vibrator is as illustrated in FIG. 8 (In FIG. 8, the spacer 160 is located underneath the coil 170, and is not visible).

The resonant frequency f2 is determined mainly by the spring constant of the spring 150 and the weight of the spring 150, the spacer 160, and the coil 170. Therefore, the spring constant of the spring 150 may be set to an appropriate value by taking into consideration the resonant frequency f2 and the weight of the spring 150, the spacer 160, and the coil 170.

The vibration generator 100 selectively causes the first vibrator including the spring 120, the yoke 130, and the magnet 140 and the second vibrator including the spring 150, the spacer 160, and the coil 170 to resonate, by setting the frequency of an alternating current flowing through the coil 170 to the frequency f1 or the frequency f2.

The yoke 130 is used to efficiently cause the first vibrator or the second vibrator to resonate at the frequency f1 or the frequency f2. The yoke 130 has the through hole 130C in the Y direction. The magnet 140 of the first vibrator, and the spring 150, the spacer 160, and the coil 170 of the second vibrator are disposed within the through hole 130C (see particularly FIG. 4).

With the above-described configuration, vibrations are efficiently generated at the two resonant frequencies. Further, vibrations can be generated at the two resonant frequencies by using the one magnet 140 and the one coil 170, thus simplifying the configuration of the vibration generator 100.

Figure 9:
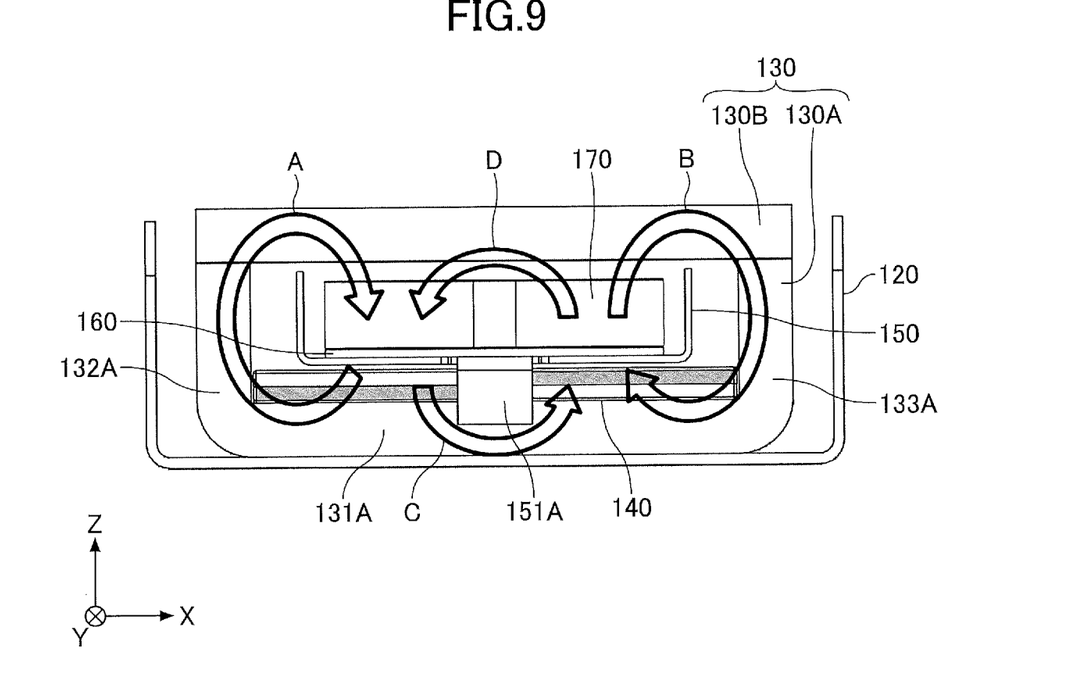
FIG. 9 is a diagram illustrating the principle of vibration generation in the vibration generator 100.

FIG. 9 is a diagram illustrating the principle of vibration generation in the vibration generator 100. In FIG. 9, the housing 110 is not depicted.

On the −X side of the magnet 140, the S-pole (indicated in white) is located on the upper side of the magnet 140 and the N-pole (indicated in gray) is located on the lower side of the magnet 140, and thus, a magnetic field in the +Z direction is generated as indicated by an arrow A. Therefore, a magnetic flux in the +Z direction is generated at the side portion 132A.

Further, on the +X side of the magnet 140, the N-pole (indicated in grey) is located on the upper side of the magnet 140 and the S-pole (indicated in white) is located on the lower side of the magnet 140, and thus, a magnetic field in the −Z direction is generated as indicated by an arrow B. Therefore, a magnetic flux in the −Z direction is generated at the side portion 133A.

Further, on the lower side of the magnet 140, the N-pole (indicated in grey) is located on the −X side and the S-pole (indicated in white) is located on the +X side, and thus, a magnetic field in the +X direction is generated as indicated by an arrow C. Therefore, a magnetic flux in the +X direction is generated at the bottom portion 131A.

Further, on the upper side of the magnet 140, the S-pole (indicated in white) is located on the −X side and the N-pole (indicated in grey) is located on the +X side, and thus, a magnetic field in the −X direction is generated as indicated by an arrow D. Therefore, a magnetic flux in the −X direction is generated at the top yoke portion 130B.

With the above-configuration, a counterclockwise magnetic flux is generated in the yoke 130 when viewed in the XZ plane in the −Y direction. By providing the above-described yoke 130, it is possible to confine a magnetic flux generated by the magnet 140 into the magnetic circuit of the yoke 130, thereby minimizing magnetic flux leakage to the outside of the yoke 130.

In addition, at the straight portion 170A on the −X side of the coil 170 and extending in the Y direction, the magnetic field in the +Z direction is generated by the magnet 140 as indicated by the arrow A. Further, at the straight portion 170B located on the +X side of the coil 170 and extending in the Y direction, the magnetic field in the −Z direction is generated by the magnet 140 as indicated by the arrow B.

Because the magnet 140 and the coil 170 are disposed within the through hole 130C of the yoke 130, and magnetic flux leakage to the outside of the yoke 130 is minimized, the magnetic fields generated by the magnet 140 within the coil 170 as described above are increased as compared to when there is no yoke 130.

Further, by applying an electric current to the coil 170 in a clockwise direction when viewed in the XY plane in the +Z direction (the XY plane), forces (electromagnetic forces) both in the +X direction act on the straight portion 170A and the straight portion 170B of the coil 170 according to Fleming's left-hand rule.

Therefore, by applying an alternating current to the coil 170, an electromagnetic force in the +X direction and an electromagnetic force in the −X direction are alternately generated in the coil 170 (that is, electromagnetic forces in the ±X direction are generated). In accordance with the principle of action and reaction, forces in directions opposite to the electromagnetic forces generated in the coil 17 act on the magnet 140.

That is, by applying an alternating current to the coil 170, an electromagnetic force in the +X direction and an electromagnetic force in the −X direction are alternately generated in the coil 170, and an electromagnetic force in the −X direction and an electromagnetic force in the +X direction are alternately generated in the magnet 140.

Therefore, the first vibrator including the spring 120, the yoke 130, and the magnet 140 resonates by setting the frequency of an alternating current flowing through the coil 170 to the resonant frequency f1 of the first vibrator. Further, the second vibrator including the spring 150, the spacer 160, and the coil 170 resonates by setting the frequency of an alternating current flowing through the coil 170 to the resonant frequency f2 of the second vibrator.

Further, the straight portions 170A and 170B extend linearly in the Y direction, and the length in the Y direction of the straight portions 170A and 170B is less than or equal to the length in the Y direction of the magnet 140. In addition, the straight portions 170A and 170B are positioned to fit within the length in the Y direction of the magnet 140. In other words, the length in the Y direction of the magnet 140 is greater than or equal to the length of the straight portions 170A and 170B.

By setting the length in the Y direction of the magnet 140 to be greater than or equal to the length in the Y direction of the straight portions 170A and 170B, and positioning the straight portions 170A and 170B within the length in the Y direction of the magnet 140, it becomes possible for the electromagnetic forces in the X direction to act on the entire straight portions 170A and 170B when the current flows through the coil 170.

That is, because of longer portions extending in the Y direction in the magnetic fields in the Z direction generated by the magnet 140, larger electromagnetic forces act on the coil 170.

Note that when the first vibrator resonates, the second vibrator also vibrates. However, the resonance of the first vibrator becomes dominant because the resonant frequency of the first vibrator differs from the resonant frequency of the second vibrator. The same applies to the opposite case.

Figure 10:
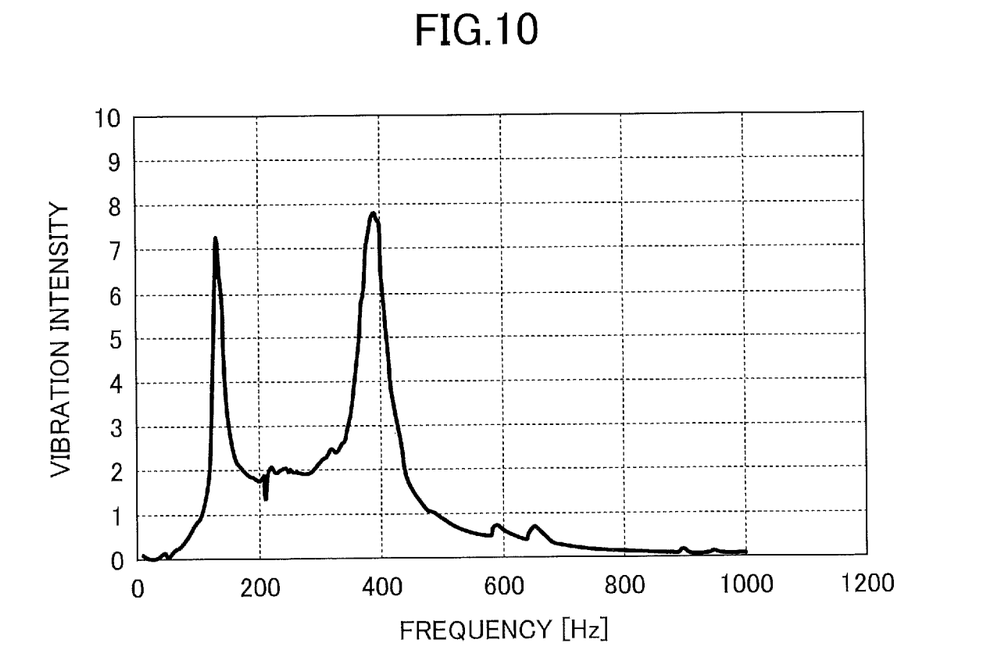
FIG. 10 is a graph illustrating vibration data measured in the vibration generator 100.

FIG. 10 is a graph illustrating vibration data measured in the vibration generator 100. In FIG. 10, the horizontal axis represents the frequency (Hz) and the vertical axis represents the vibration intensity (arbitrary unit). In this example, the vibration was measured by setting the resonant frequency f1 to 140 Hz and the resonant frequency f2 to 380 Hz.

As illustrated in FIG. 10, the intensity of the vibration increased at the resonant frequency f1 of 140 Hz and the resonant frequency f2 of 380 Hz. Accordingly, it was verified that the first vibrator resonates at the resonant frequency f1 of 140 Hz, and the second vibrator resonates at the resonant frequency f2 of 380 Hz.

In the above-described embodiment, the first vibrator and the second vibrator resonate at the resonant frequency f1 and the resonant frequency f2, respectively, by utilizing the magnetic fields increased by the yoke 130. Thus, the magnetic fields are efficiently utilized.

Accordingly, it is possible to provide the vibration generator 100 that efficiently utilizes magnetic fields to generate vibrations.

In addition, it is possible to generate vibrations in the same direction (in the X direction) at the two different resonant frequencies. Accordingly, it is possible to provide the vibration generator 100 that efficiently utilizes a magnetic field to generate vibrations at the two different resonant frequencies. For example, if a touch panel is equipped with the vibration generator 100, different vibrations can be generated in accordance with the operation on the touch panel, and thus different tactile sensations can be provided in accordance with the operation.

Further, because the magnetic fields can be efficiently utilized to generate vibrations, the amount of current flowing through the coil 170 can be reduced to obtain the same vibration intensity.

In the above-described embodiment, the housing 110 is made of sheet metal. However, the housing 110 is not required to be made of sheet metal, and may be made of a material such as a resin, other than metal. Further, the housing 110 is not required to be separated into the base 110A and the cover 110B, as long as the housing 110 can accommodate the spring 120, the yoke 130, the magnet 140, the spring 150, the spacer 160, and the coil 170. In particular, various structures may be employed to fix the cover 110B to the base 110A.

Further, in the above-described embodiment, the spring 120 includes the fixing portion 121, the movable portion 122, and the intermediate portions 123, and the fixing portion 121 and the movable portion 122 are in the same plane. However, any other configuration may be employed as long as the movable portion 122 is movable in the X direction with respect to the fixing portion 121.

Further, in the above-described embodiment, the yoke 130 is separated into the yoke portion 130A and the top yoke portion 130B. However, the yoke 130 may be separated into any portions as long as the yoke 130 has the through hole 130C in the direction (Y direction) perpendicular to the vibration direction (X direction) of the first vibrator and the second vibrator in the vibration plane (XY plane).

Further, in the above-described embodiment, the magnet 140 is disposed on the upper surface of the bottom portion 131A of the yoke 130. However, the magnet 140 may be attached to the lower surface of the top yoke portion 130B of the yoke 130. Further, two magnets 140 may be included, and one of the magnets 140 may be disposed on the upper surface of the bottom portion 131A of the yoke 130, and the other magnet 140 may be attached to the lower surface of the top yoke portion 130B.

Further, in the above-described embodiment, the spring 150 includes the two fixing portions 151, the one movable portion 152, and the four intermediate portions 153, and the fixing portions 151 and the movable portion 152 are in the same plane. However, any other configuration may be employed as long as the movable portion 152 is movable in the X direction with respect to the fixing portions 151. For example, the movable portion 152 may be offset in the +Z direction relative to the fixing portions 151. In such a case, it is not required to provide the spacer 160.

Although specific embodiments have been described, the present invention is not limited to the above-described embodiments. Variations and modifications may be made to the described subject matter without departing from the scope of the invention as set forth in the accompanying claims.

What is claimed is:

1. A vibration generator comprising:
a housing;

a first vibrator, the first vibrator including a hollow yoke having a through hole, a magnet disposed within the through hole of the yoke, and a first elastic support member; and a second vibrator, the second vibrator including a coil disposed above or below the magnet within the through hole of the yoke, and a second elastic support member to which the coil is fixed and that is disposed to extend from inside to outside of the through hole of the yoke and that is fixed to the housing, wherein the first vibrator is supported within the housing via the first elastic support member and configured to vibrate at a first natural frequency in a direction connecting both side portions of the yoke, and the second vibrator is supported within the housing and configured to vibrate at a second natural frequency in the direction connecting the both side portions of the yoke, the second natural frequency being different from the first natural frequency.

2. The vibration generator according to claim 1, wherein the hollow yoke is formed by connecting a bottom portion, a first side portion, a top plate portion, and a second side portion in this order, the through hole is defined by the bottom portion, the first side portion, the top plate portion, and the second side portion, and the direction connecting the both side portions of the yoke is a direction connecting the first side portion and the second side portion of the yoke.

3. The vibration generator according to claim 2, wherein the coil includes a first portion located on a side closer to the first side portion of the yoke and a second portion located on a side closer to the second side portion of the yoke, and the coil is wound in an annular shape.

4. The vibration generator according to claim 3, wherein the first portion and the second portion extend linearly in an extension direction of the through hole.

5. The vibration generator according to claim 4, wherein a length, in the extension direction of the through hole, of the magnet is greater than or equal to a length, in the extension direction of the through hole, of the first portion and the second portion.

6. The vibration generator according to claim 2, wherein the magnet includes a first magnet portion disposed on a side closer to the first side portion of the yoke to generate a first magnetic field in a first direction connecting the bottom portion and the top plate portion of the yoke, and a second magnet portion disposed on a side closer to the second side portion of the yoke to generate a second magnetic field in a second direction connecting the bottom portion and the top plate portion of the yoke.

* * * * *